J. A. GUTENSON.
GRINDER.
APPLICATION FILED SEPT. 26, 1919.
1,429,135.
Patented Sept. 12, 1922.
6 SHEETS—SHEET 2.
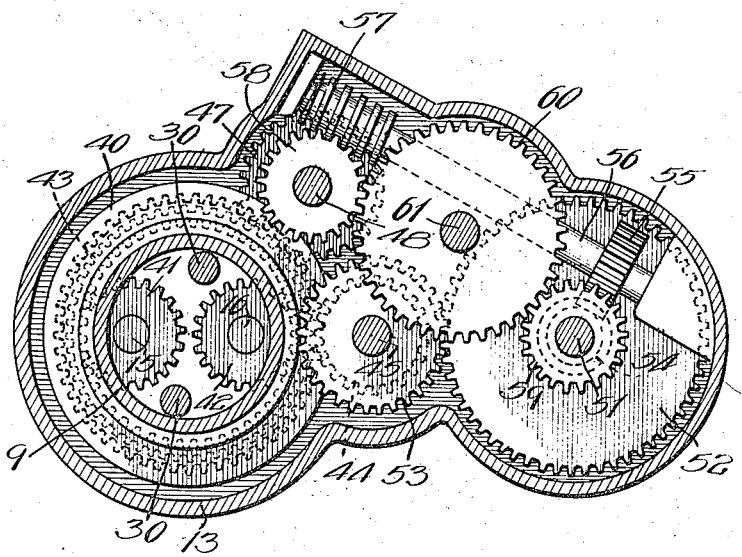
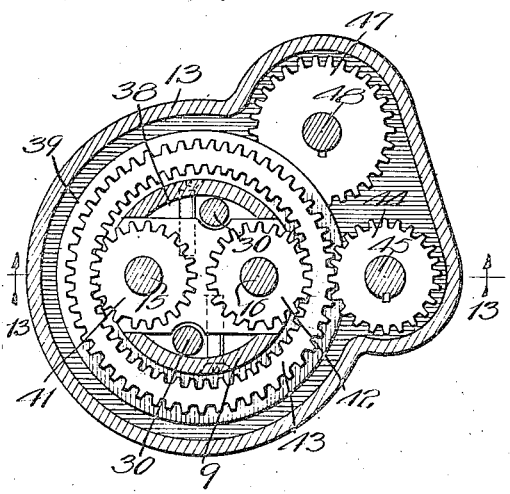
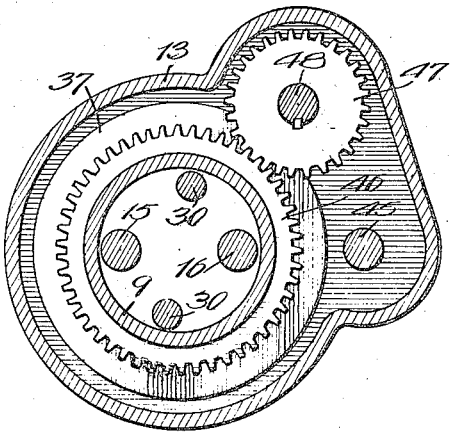
Inventor:
Joseph A. Gutenson,

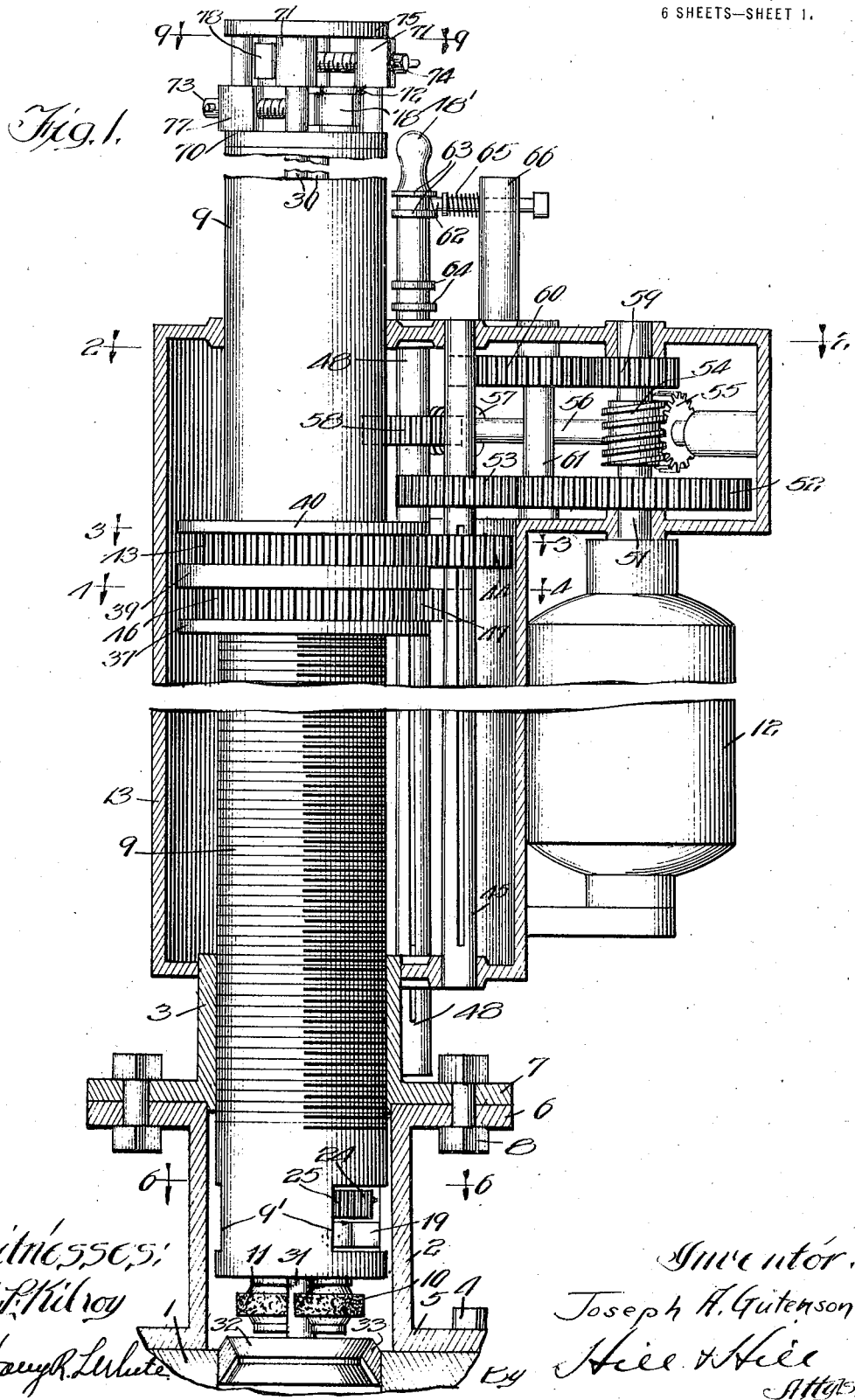

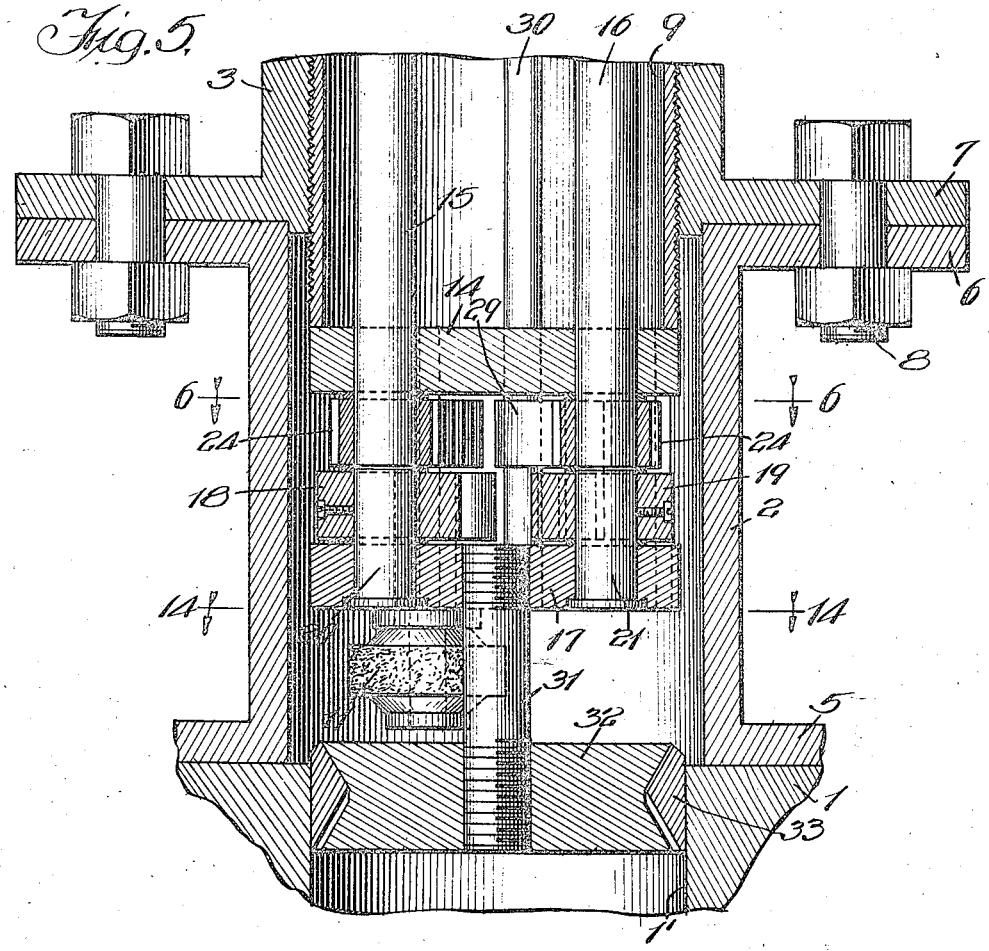
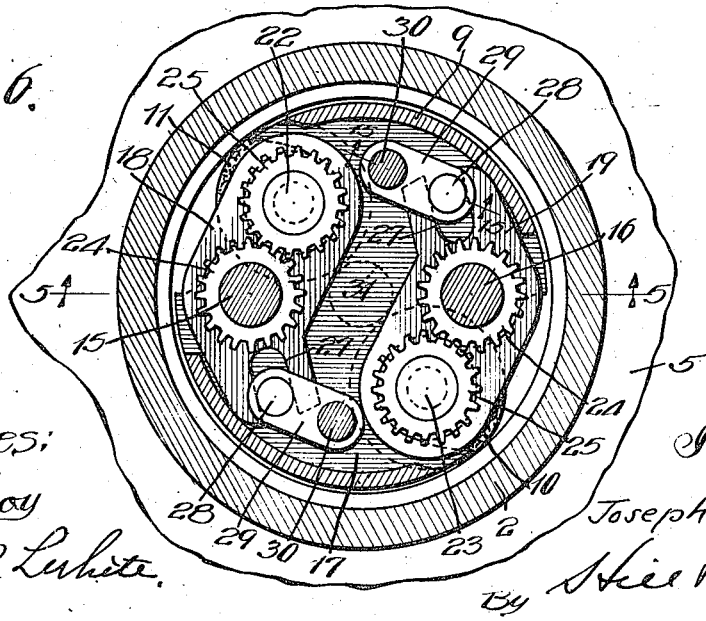

J. A. GUTENSON.
GRINDER.
APPLICATION FILED SEPT. 26, 1919.
1,429,135.
Patented Sept. 12, 1922.
6 SHEETS—SHEET 4.
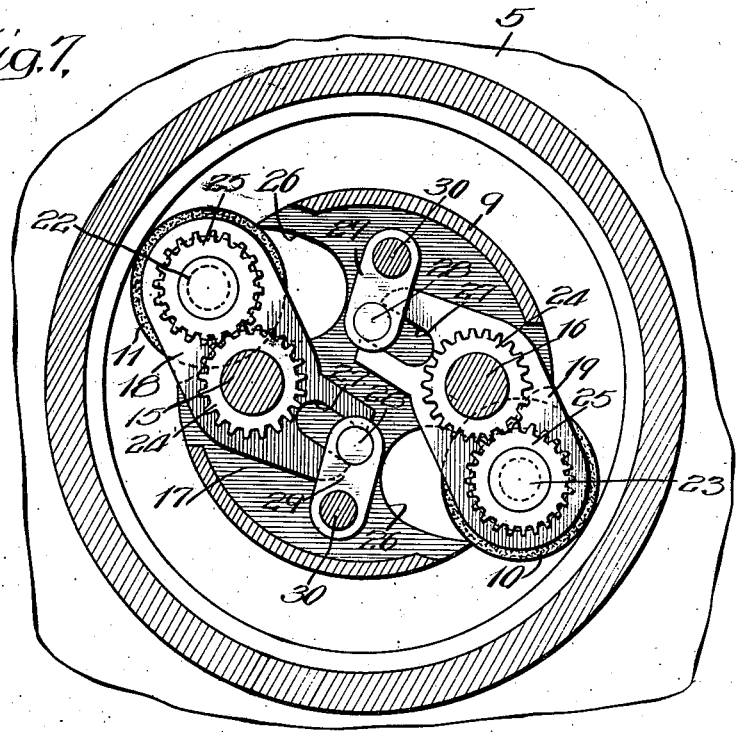
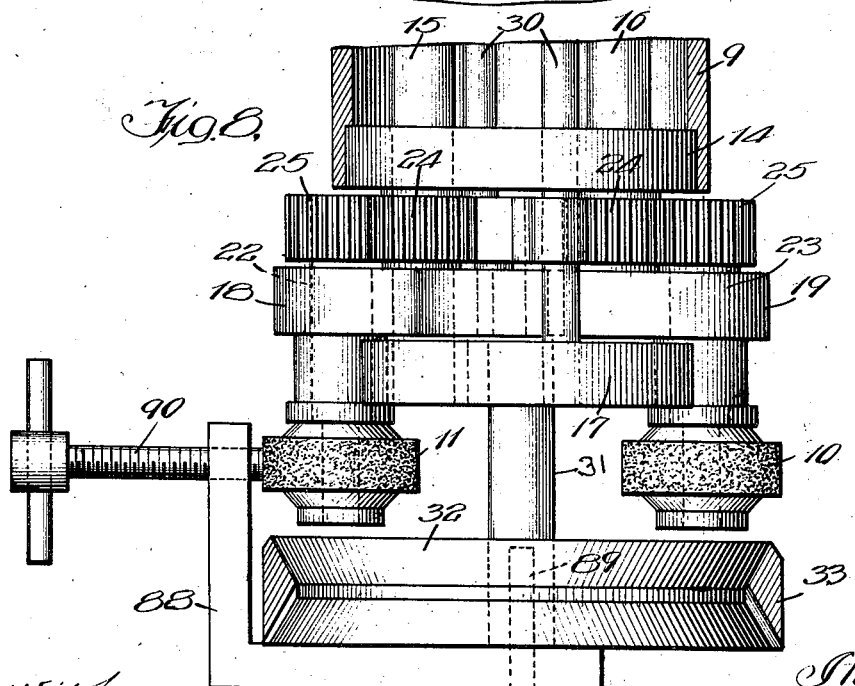
Witnesses:
W. J. Kilroy
Harry R. L. White.
Inventor:
Joseph A. Gutenson
By Hill & Hill
Attys.

J. A. GUTENSON.
GRINDER.
APPLICATION FILED SEPT. 26, 1919.
1,429,135.
Patented Sept. 12, 1922.
6 SHEETS—SHEET 5.
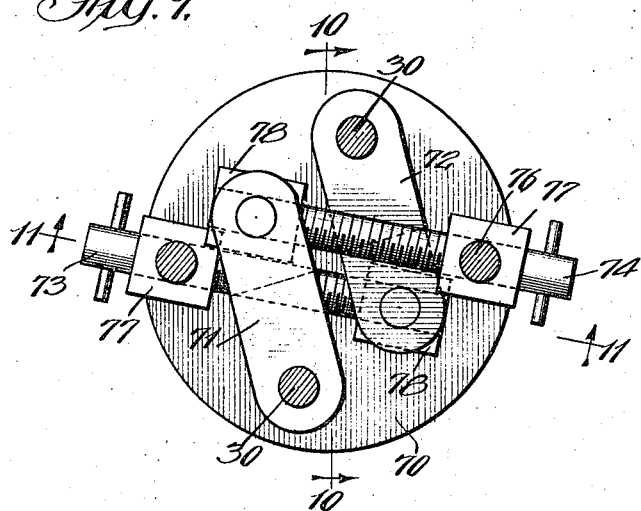
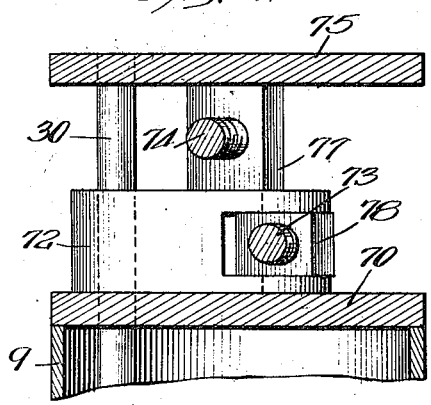
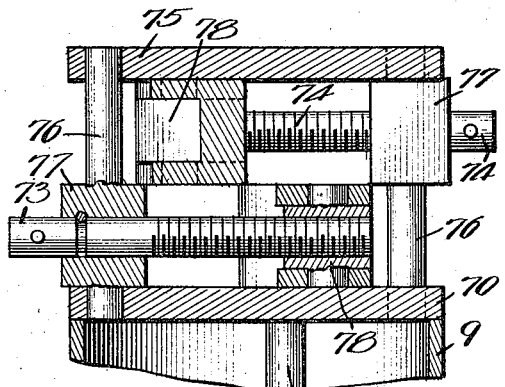
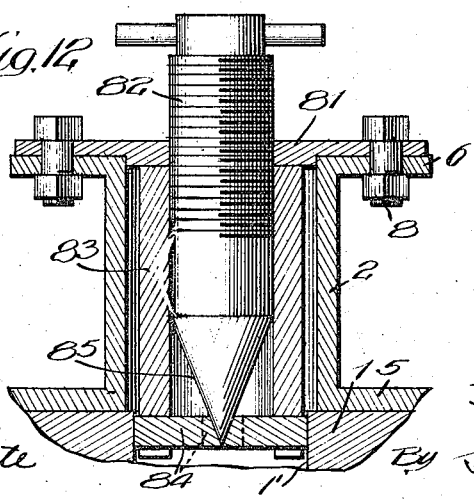
Witnesses:
W. F. Kilroy
Harry R. L. White
Inventor:
Joseph A. Gutenson
By Hill & Hill
Attys.

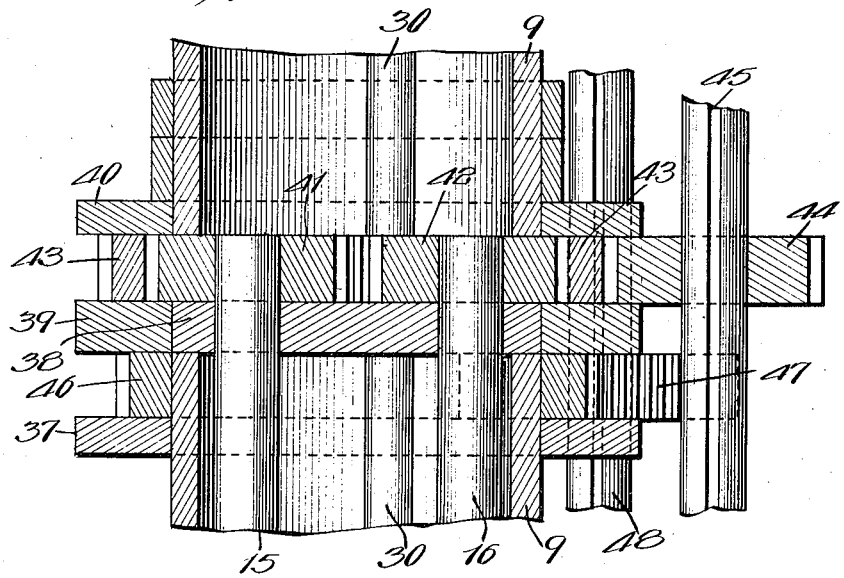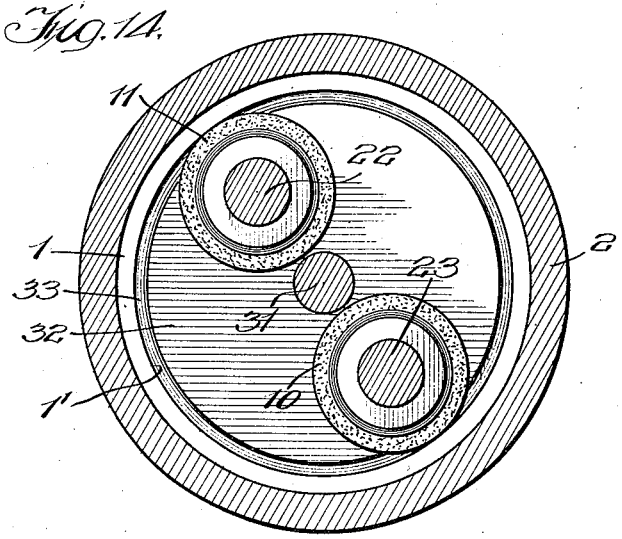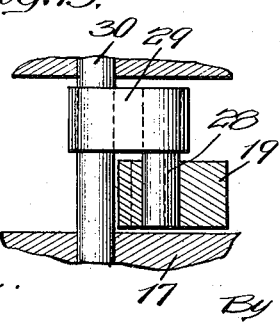

Patented Sept. 12, 1922.

1,429,135

UNITED STATES PATENT OFFICE.

JOSEPH A. GUTENSON, OF CHICAGO, ILLINOIS.

GRINDER.

Application filed September 26, 1919. Serial No. 326,517.

*To all whom it may concern:*

Be it known that I, JOSEPH A. GUTENSON, a citizen of the United States, residing at Chicago, in the county of Cook and State of Illinois, have invented certain new and useful Improvements in Grinders, of which the following is a description.

My invention belongs to that general class of devices known as grinders, and relates particularly to a grinder for grinding the interior of internal combustion engine cylinders or the like. The invention has among its objects the production of a portable grinder whereby the cylinders of an internal combustion engine may be reground without entirely disassembling the motor or engine. The invention has among its further objects the production of a device of the kind described that is simple, convenient, compact, durable, efficient and satisfactory for use wherever found applicable. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

Referring to the drawings, in which like indicating characters indicate like or corresponding parts—

Fig. 1 is a sectional view through my improved grinder, a portion of the parts being shown in elevation;

Fig. 2 is a sectional view taken substantially on line 2—2 of Fig. 1;

Fig. 3 is a sectional view taken substantially on line 3—3 of Fig. 1;

Fig. 4 is a sectional view taken substantially on line 4—4 of Fig. 1;

Fig. 5 is a sectional view taken substantially on line 5—5 of Fig. 6;

Fig. 6 is a sectional view taken substantially on line 6—6 of Figs. 1 and 5;

Fig. 7 is a sectional view similar to Fig. 6 showing the grinders adjusted outwardly for grinding a cylindrical surface of greater internal diameter;

Fig. 8 is a view in elevation of the mechanism shown in Fig. 5, a portion being shown in section and illustrating the setting of the grinders;

Fig. 9 is a sectional view taken substantially on line 9—9 of Fig. 1;

Fig. 10 is a sectional view taken substantially on line 10—10 of Fig. 9;

Fig. 11 is a sectional view taken substantially on line 11—11 of Fig. 9;

Fig. 12 is a sectional view of the member 2 illustrating the mechanism for centering the same over the surface to be ground;

Fig. 13 is a sectional view taken substantially on line 13—13 of Fig. 3;

Fig. 14 is a sectional view taken substantially on line 14—14 of Fig. 5; and

Fig. 15 is a sectional view taken substantially on line 15—15 of Fig. 6.

Referring to the drawings, particularly Figs. 1 and 5, 1 represents a chambered part having an internal bore 1' which is to be ground or reground, it being understood that 1 may represent a portion of an engine cylinder or any other part which is to be worked upon. To part 1 is secured a sleeve 2 which constitutes a supporting member which carries the part 3 or base of the grinding tool. As shown, part 2 is flanged as at 5 and secured in place on 1 by bolts 4, or equivalent means for the purpose, the mechanism for centering part 2 over the bore 1' being hereafter described. Parts 2 and 3 are formed with the flanges 6 and 7 and secured together by bolts 8 or the equivalents after part 2 has been arranged on the part 1 and secured in place.

Part 3 in the construction shown is internally threaded and carries a tubular member or spindle 9 threaded on the exterior to engage with the interior thread on part 3, so that as part 9 is rotated it will be fed lengthwise in the part 3. The pitch of the thread will of course depend upon the speed of rotation and the desired rate of travel. The tubular spindle 9 carries the desired number of grinding wheels, two wheels 10 and 11 being shown, which are driven through suitable mechanism connecting the same with a motor 12 or equivalent source of power. The motor 12 is arranged in the construction shown on a casing 13 which is carried by the part 3 and surrounds the spindle 9 and connecting mechanism operatively connected with the motor. Obviously the motor 12 represents any source of power, this being immaterial in so far as the present invention is concerned, except that by employing the motor as shown a very compact and convenient portable tool is afforded.

Referring particularly to Fig. 5, the spindle carries a cross bar or plate 14 adjacent its lower end through which project driving shafts 15 and 16. The part 9 is also provided with a cross part or end 17, part 9 being cut away as at 9' on each side as most clearly shown in Figs. 1 and 7. Arranged on the cross part 17 are arms 18 and 19, the same being secured to the part 17 by the pins 20 and 21, or their equivalents for the purpose. Arms 18 and 19 carry shafts 22 and 23 which project through part 17 and carry the grinding wheels 11 and 10 respectively. The same also carry gears or pinions 25 which mesh with the gears 24 arranged on the shafts 16 and 15. Obviously as the shafts 15 and 16 are driven they drive the grinding wheels 11 and 10 through this gearing. The construction is such, however, that the arms 18 and 19 may be adjusted so as to increase the distance between the grinders 10 and 11, or decrease the same so that various sized cylinders may be ground. Obviously a variation is also obtained by varying the size of the grinders. As shown, each of the members 18 and 19 is extended at the opposite end and formed with a slot or notch 27 arranged to receive a pin 28 carried on an arm 29 which is secured on a rod 30. In the construction shown, where two grinding wheels are employed, I prefer to provide two rods 30, one for each arm, so that the arms may be adjusted independently. In case one grinding wheel wears more than the other it may be independently adjusted. As most clearly shown in Figs. 1 and 5, part 17 carries a rod 31 which carries a member 32 and a preferably split tapered ring 33. Ring 33 travels down the internal wall to be reground and guides the spindle and grinders, preventing any sidewise movement and steadies the same.

Arranged intermediate the ends of the tubular spindle 9 is a cross plate 38 (see Figs. 3 and 13) and has the rings or flanges 40, 39 and 37. Arranged on the shafts 15 and 16 between the rings 39 and 40 and also plate 38 are gears or pinions 41 and 42 which are arranged to be driven by a ring gear 43 provided with internal and external teeth. The ring gear 43 is arranged to be driven by a gear or pinion 44 which is preferably slidably arranged on a shaft 45. Secured to the spindle 9 and arranged to drive the same is a gear 46, the same being arranged between the rings 37 and 39. Gear 46 is driven by a gear or pinion 47 slidably arranged on shaft 48 which shaft is itself adjustable lengthwise, as will be hereafter described.

Referring to Figs. 1 and 2, the motor 12 is arranged to drive the shaft 51 which may be termed the main driving or power shaft. Arranged on this shaft within the casing is a gear 52 which meshes with and drives gear 53 suitably secured on shaft 45. Obviously as shaft 51 is rotated it drives the shafts 15 and 16 through the gearing described. Shaft 51 is provided with a worm gear 54 arranged to drive gear 55 on shaft 56 and this drives the gear or worm 57 secured thereon and arranged to mesh with the gear 58. Gear 58, however, is also arranged to mesh with gear 60 when shaft 48 is raised. Gear 60 is mounted on a counter-shaft 61 and is arranged to be driven by 59 secured on driving shaft 51. Raising or lowering shaft 48 so that gear 58 engages worm gear 57 or gear 60 will cause the spindle 9 to rotate in a direction to feed the grinders in one direction or to reverse the same so that the grinders travel in the other direction, that is to say, either in or out of the cylinder. A member 62 is arranged to engage with shaft 48 between the collars 63 or 64 and support the same in the desired position. Member 62 is carried by member 66 and normally maintained in engaging position by a spring 65, or the equivalent.

Arranged at the upper end of the spindle 9 is a partition or plate 70. Arranged above this plate and secured to the shafts 30 are a pair of arms 71 and 72 arranged to be controlled by the screw members 73 and 74. As clearly shown in Fig. 11, 75 is a plate carried by rods 30—30 and the pivot members 76 which are provided on blocks 77 through which the members 73 and 74 pass. The members 73 and 74 also carry blocks 78 which are pivotally secured to the links or arms 71 and 72. Obviously as members 73 or 74 are turned they tend to move the links 71 and 72, thereby partially rotating or rocking the rods 30, and thereby, through the mechanism previously described and illustrated in Figs. 6 and 7, controlling the position of the grinding wheels.

In order to center the member 2 on the engine cylinder or on the part to be reground I provide mechanism similar to that shown in Fig. 12, or its equivalent. Referring to this figure, 81 represents a plate which may be secured to the part 1 by bolts 8, or the equivalent. Plate 81 carries a screw member 82 and a depending sleeve 83 into which the screw member 82 slides. Carried by the sleeve member 83 are a plurality of members 84. Ordinarily I provide three or more, a four member construction being illustrated. These members are slidable and are adapted to engage the inner wall to be reground. When the member 82 is turned so that the point 85 engages with the members 84, part 2 slides on part 1 and is centrally located relative to the opening in the part. Part 2 is then bolted or otherwise secured to part 1 and parts 81, 82, 83 and 84 removed. Part 3 may then be bolted in place. In Fig. 8 I show a gauging member consisting of part 88 having a pin 89 arranged to fit in a hole or recess in post 31. 90 is a screw carried by part 88 and arranged to gauge the distance of the periphery of the grinders from the center of the post 31 or axis of the tubular spindle 9. I have shown a simplified construction of the gauge, it being obvious that the same may be of micrometer construction. In view of the fact, however, that the details of construction of the gauge are immaterial in so far as the present invention is concerned, I have shown only a simple form.

It is believed that the operation of the device from the preceding description will be obvious. When the grinder is mounted, it is as shown in Fig. 1, it being understood that it is immaterial whether the cylinder is vertical or horizontal, or whether the cylinders are ground from the bottom, the crank case being removed, or from the top, the cylinder heads being removed. If the parts adjusted as shown and shaft 51 driven, power will be transmitted through gears 52 and 53 to shaft 45 and through gear 44 to ring gear 43, thereby driving the gears 41 and 42 and shafts 15 and 16. Shafts 15 and 16 through gears 24 and 25 drive the shafts 22 and 23, thereby causing the grinder wheels 10 and 11 to be driven. At the same time power is transmitted from driving shaft 51 through gear 55, shaft 56, gear 57, gear 58 and shaft 48 to gear 47, which drives the gear 46, thereby rotating or driving the spindle 9. As the spindle moves lengthwise gears 44 and 47 slide on their driving shafts 45 and 48, the same being driven, however, as they slide. They are caused to travel on the shafts by means of the collars 40, 39 and 37. If shaft 48 is raised and supported with the supporting member 62 engaging between the collars 64 on the shaft, gear 58 will engage with gear 60, causing shaft 48 to be driven in the reverse direction. This causes the spindle to be rotated in the reverse direction. Obviously the gears may be so designed as to vary the speed and cause a quick return on reverse, or during the withdrawal of the grinders.

As the spindle is moved in the cylinder the same not only rotates, carrying the grinders about the inner wall of the cylinder, but at the same time the grinders are moved lengthwise of the cylinder grinding the same perfectly from end to end. It will be particularly noted that as the spindle moves, being guided at the outer end by the ring 33, the same travels in a direct line down the cylinder, grinding the same evenly and true.

While I have particularly described the device as suitable for grinding engine cylinders, obviously its use is not so limited. In some cases it might be desirable to replace the grinding wheels 10 and 11 with cutters of a preferred type.

Having thus described my invention, it is obvious that various immaterial modifications may be made in the same without departing from the spirit of my invention; hence I do not wish to be understood as limiting myself to the particular construction, arrangement and combination of parts and uses mentioned.

What I claim as new and desire to secure by Letters Patent is:

1. In a device of the kind described and in combination, a rotatable and longitudinally movable spindle, means for supporting the spindle, means for rotating said spindle in either direction, grinding wheels arranged at one end of the spindle, adjustable supporting means for said grinding wheels, a shaft for each grinding wheel extending through the spindle and operatively connected with the grinding wheels, means intermediate the ends of the spindle and movable therewith for driving said shafts, and means operatively connected with said adjustable supporting means and extending to the opposite end of the spindle for independently controlling said supporting means to vary the positions of the grinding wheels relative to each other and the spindle axis, and means for guiding the spindle and maintaining the same against transverse movement in the work.

2. In a device of the kind described and in combination, a rotatable and longitudinally movable spindle, means for carrying said spindle, a grinding wheel secured to said spindle, and means for driving said wheel and spindle independently of each other, said spindle driving means comprising a gear arranged thereon, said grinding wheel driving means comprising a second gear arranged on said spindle, means for driving said first mentioned gear on said spindle and means for driving said second mentioned gear on said spindle, said second driving means arranged to drive the spindle in either direction.

3. In a device of the kind described and in combination, a rotatable and longitudinally movable spindle, means for carrying said spindle, a shaft extending through said spindle to adjacent the lower end thereof, a grinding wheel operatively connected to said shaft, a gear carried by said spindle and arranged to drive said shaft, a second gear arranged on said spindle, means for driving said first mentioned gear on said spindle, and means for driving said second mentioned gear on said spindle, said second driving means arranged to drive the spindle in either direction.

4. In a device of the kind described and in combination, a rotatable and longitudinally movable spindle, means for carrying said spindle, a shaft extending through said spindle to adjacent the lower end thereof, an arm pivotally carried by said spindle at the end of said shaft, a grinding wheel shaft carried by said arm and operatively connected to said first mentioned shaft, and a grinding wheel carried by said second mentioned shaft, a gear carried by said spindle to drive said first mentioned shaft, a second gear arranged on said spindle, means for driving said first mentioned gear on said spindle, and means for driving said second mentioned gear on said spindle, said second driving means arranged to drive the spindle in either direction.

5. In a grinding device of the kind described and in combination, a suitable frame comprising a tubular part internally threaded and provided with a casing at one end thereof, means for securing said tubular part to the work to be ground, a tubular spindle threaded to engage said thread on said part and extending through the casing, a pair of shafts extending through said tubular spindle to adjacent the lower end thereof, a pair of arms, each pivotally carried by the spindle at the ends of said shafts, a grinder wheel shaft carried by each arm, intermeshing gears carried by said shafts whereby the second shafts are driven upon rotation from the first mentioned shafts, and grinding wheels carried by said shafts, each of said first mentioned shafts provided with a gear at the opposite end thereof at the interior of said spindle, a gear carried by said spindle and meshing with said gears on said shafts, a second gear arranged on said spindle, means for driving said first mentioned gear on said spindle and means for driving said second mentioned gear on said spindle, said second driving means arranged to drive the second mentioned gear in either direction.

6. In a grinding device of the kind described and in combination, a suitable frame comprising a tubular part internally threaded and provided with a casing at one end thereof, means for securing said tubular part to the work to be ground, a tubular spindle threaded to engage said thread on said part and extending through the casing, a pair of shafts extending through said tubular spindle to adjacent the lower end thereof, a pair of arms, each pivotally carried by the spindle at the ends of said shafts, a grinder wheel shaft carried by each arm, intermeshing gears carried by said shafts whereby the second shafts are driven upon rotation from the first mentioned shafts, and grinding wheels carried by said shafts, means for gauging the adjustment of the grinding wheels and arms, each of said first mentioned shafts provided with a gear at the opposite end thereof at the interior of said spindle, a gear carried by said spindle and meshing with said gears on said shafts, a second gear arranged on said spindle, means for driving said first mentioned gear on said spindle and means for driving said second mentioned gear on said spindle, said second driving means arranged to drive the second mentioned gear in either direction.

7. In a grinding device of the kind described and in combination, a suitable frame comprising a tubular part internally threaded and provided with a casing at one end thereof, means for securing said tubular part to the work to be ground, a tubular spindle threaded to engage said thread on said part and extending through the casing, a pair of shafts extending through said tubular spindle to adjacent the lower end thereof, a pair of arms, each pivotally carried by the spindle at the ends of said shafts, means for controlling the adjustment of said arms, a grinder wheel shaft carried by each arm, intermeshing gears carried by said shafts whereby the second shafts are driven upon rotation from the first mentioned shafts, and grinding wheels carried by said shafts, each of said first mentioned shafts provided with a gear at the opposite end thereof at the interior of said spindle, a gear carried by said spindle and meshing with said gears on said shafts, a second gear arranged on said spindle, means for driving said first mentioned gear on said spindle and means for driving said second mentioned gear on said spindle, said second driving means arranged to drive the second mentioned gear in either direction.

8. In a grinding device of the kind described and in combination, a suitable frame comprising a tubular part internally threaded and provided with a casing at one end thereof, means for securing said tubular part to the work to be ground, means for centering the same on the work, a tubular spindle threaded to engage said thread on said part and extending through the casing, a pair of shafts extending through said tubular spindle to adjacent the lower end thereof, a pair of arms, each pivotally carried by the spindle at the ends of said shafts, a grinder wheel shaft carried by each arm, intermeshing gears carried by said shafts whereby the second shafts are driven upon rotation from the first mentioned shafts, and grinding wheels carried by said shafts, each of said first mentioned shafts provided with a gear at the opposite end thereof at the interior of said spindle, a gear carried by said spindle and meshing with said gears on said shafts, a second gear arranged on said spindle, means for driving said first mentioned gear on said spindle and means for driving said second mentioned gear on said spindle, said second driving means arranged to drive the second mentioned gear in either direction.

In testimony whereof, I have hereunto signed my name in the presence of two subscribing witnesses.

JOSEPH A. GUTENSON.

Witnesses:
 Roy W. Hill,
 Bernice Delaney.